Patented Dec. 5, 1922.

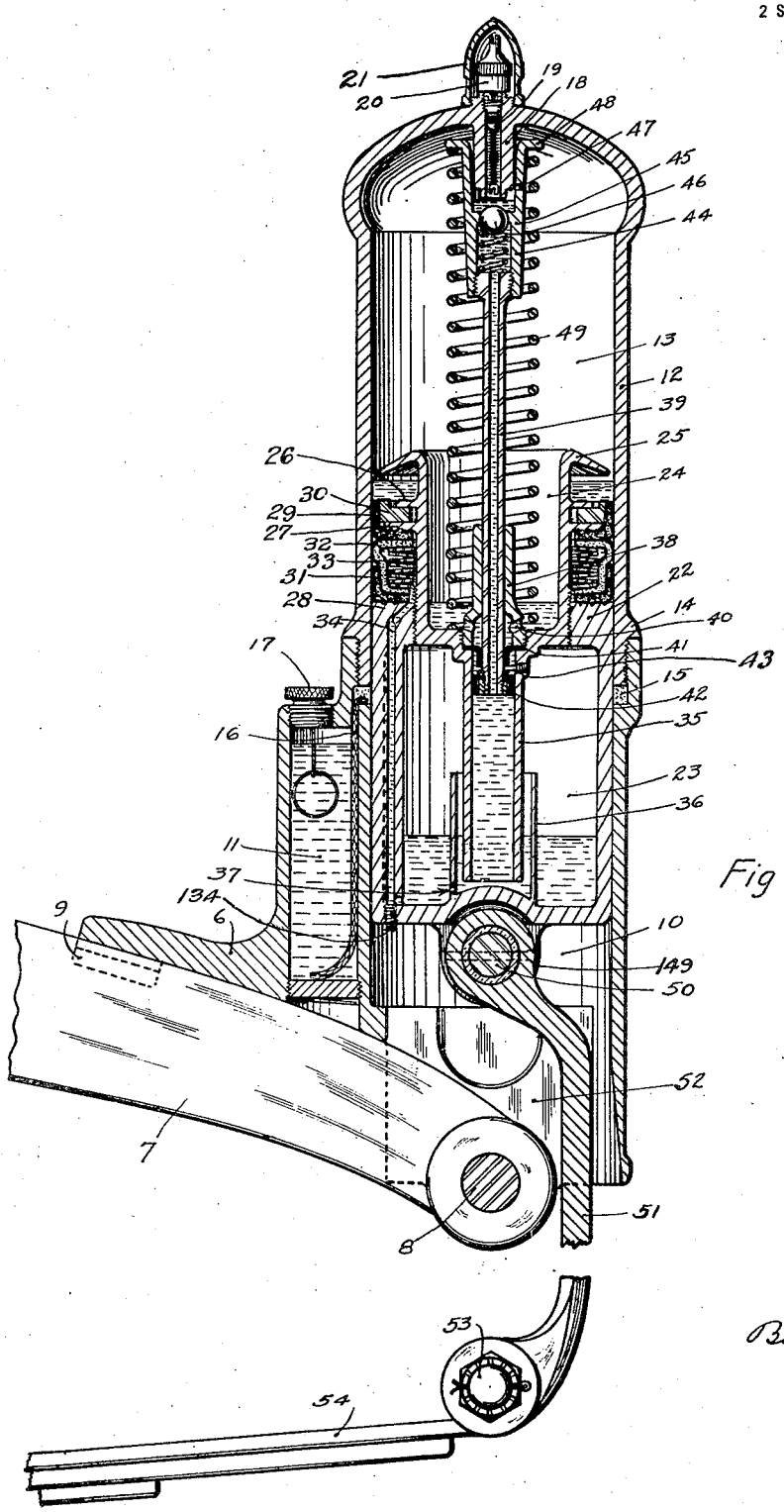

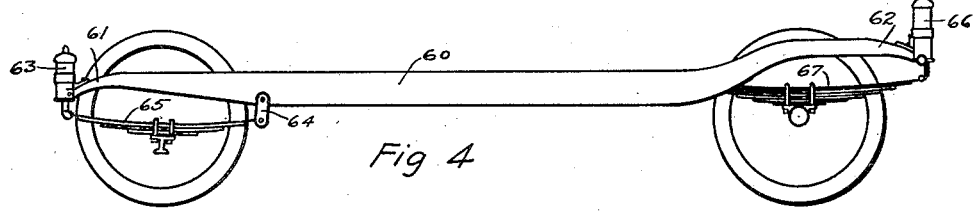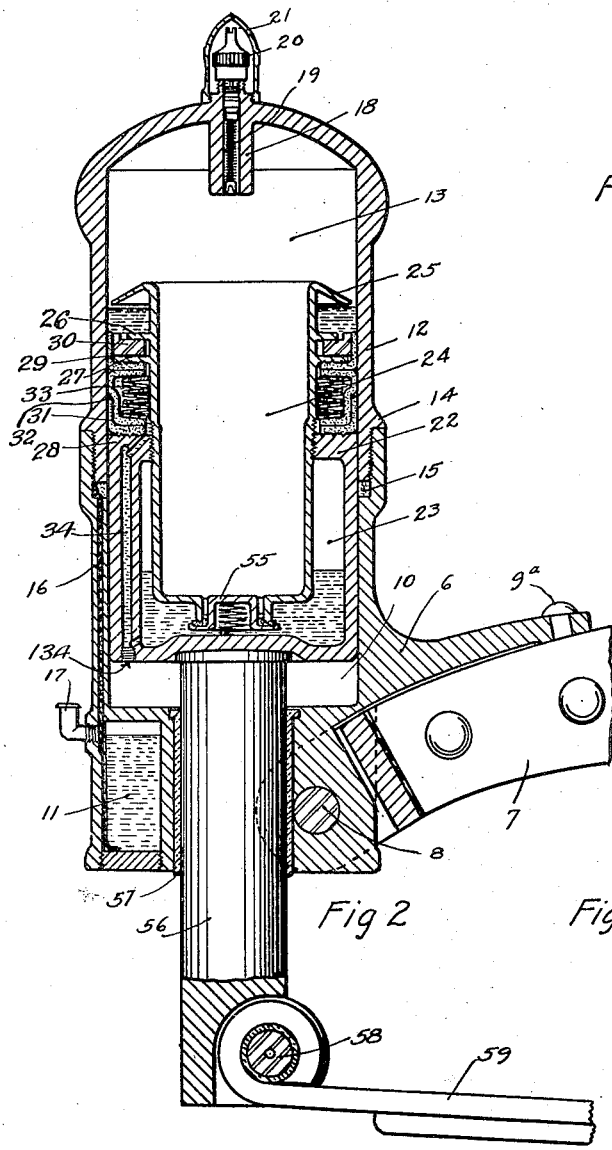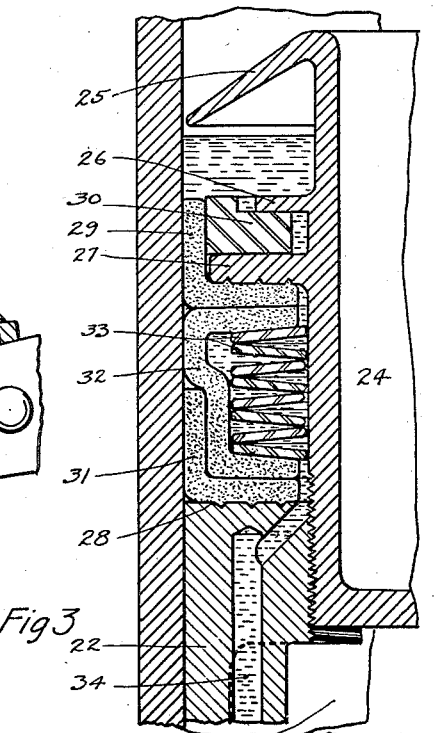

1,437,894

UNITED STATES PATENT OFFICE.

BRADFORD B. HOLMES, OF BELLINGHAM, WASHINGTON.

VEHICLE SUSPENSION.

Application filed November 14, 1919. Serial No. 337,953.

*To all whom it may concern:*

Be it known that I, BRADFORD B. HOLMES, a citizen of the United States, residing at Bellingham, in the county of Whatcom and State of Washington, have invented certain new and useful Improvements in Vehicle Suspensions, of which the following is a specification.

This invention relates to pneumatic cushioning devices, and particularly to a self-contained, self-regulating air cushion intended primarily for use on motor vehicles.

The prior art offers two types of self-regulating air cushions neither of which is completely satisfactory. In one a reservoir on the vehicle frame supplies pressure fluid to the cushion through a valve mechanism designed to admit pressure fluid to the cushion or exhaust it therefrom in response to load variations and relative movements between the vehicle body and the running gear. Devices of this sort have proved cumbersome because they are not self-contained, but require considerable piping on the frame of the vehicle and also require a power driven pump to furnish the pressure fluid.

Another type which has been used to some extent has included a regenerative mechanism consisting of a pump operated by load variations and by relative movements between the vehicle body and the running gear, and designed to increase the pressure in the cushion, and a regulating means consisting of a vent valve designed to vent pressure from the cushion. This type is unsatisfactory for many uses because it requires a long time for the pump to counteract the effects of increases of load, because it offers no reserve pressure to meet severe and temporarily sustained load increases such as those occasioned by side sway in rounding corners, and because the pump draws in air from the atmosphere and with it dust and grit, thus leading to rapid wear of the cushion.

The present invention involves a radically new method of operation. The device is a self-contained unit, and, in addition to the cushion, it includes a reservoir which preferably contains air at a pressure higher than that normally existing in the cushion. For some conditions the air in the cushion and in the reservoir may be of substantially the same pressure. The improved pneumatic spring structure comprises two air chambers, one of which serves as a cushion or spring, and the other of which serves as a reservoir. These two chambers are normally closed from each other, but are put into communication with each other by means controlled by load variations and by road irregularities. The reservoir and the cushion are initially charged with pressure fluid and under usual conditions the air in the reservoir is under higher pressure than the air in the cushion. The total quantity of pressure fluid in the cushion and in the reservoir is constant, but the device functions to transfer pressure fluid from the cushion to the reservoir by means operative by load shocks, and to permit a reflux of pressure fluid from the reservoir to the cushion by means controlled by the riding position of the cushion in the intervals between such shocks. Thus the relative quantities of pressure fluid in the two chambers are subject to change to meet changes in the load imposed either by the dead weight of the vehicle or by stresses incident to side sway or road irregularities.

This construction and method of operation have the following important advantages: The device is entirely self-contained and may be applied to existing vehicles. It offers a mechanism which promptly responds to increased loads, a feature of particular importance in the case of motor trucks whose load ordinarily is several times the weight of the body. It contains an immediate source of increased pressure to check any tendency to side sway or rolling of the body when rounding curves.

It is true, of course, that a spring operating on this principle will adjust itself relatively slowly to a decrease in load because it is necessary for it to operate by load oscillation or by movement caused by road irregularities to reduce the pressure in the cushion, but it is obviously better for the running gear to operate for a short period with unduly stiff springs under a light load, than to operate for a similar period with unduly weak springs under a heavy load.

The presence of the reservoir of pressure fluid at a pressure higher than that normally existing in the cushion offers a very marked advantage in packing the joint between the sliding parts of the cushion. By admitting this pressure to act behind the packing ring it is possible to secure, in a simple manner, a greater sealing pressure upon the packing ring than can ever be exerted on the packed joint by the fluid seeking to leak past it. Another advantage of the use of the reservoir is that the air in the cushion moves in a closed circuit so that the pump never draws air from the surrounding atmosphere and the valve never vents air to the atmosphere. This makes it possible to avoid the difficulties incident to the entrance of dust into the cushion and eliminates strainers and the like.

Certain such features of the invention are capable of independent use and will be claimed in broad terms.

In the drawings I illustrate practical embodiments of the invention and certain typical applications of the same to motor vehicles. In these drawings:—

Fig. 1 is a vertical axial section of a pneumatic spring embodying the essential features of this invention;

Fig. 2 is a longitudinal axial section of a pneumatic spring similar to that shown in Fig. 1, but lacking the vent valve and pump feature shown in Fig. 1;

Fig. 3 is an enlarged fragmentary view of the piston and piston packing in the structures of Figs. 1 and 2.

Fig. 4 illustrates in diagram a typical installation of my invention upon a motor car frame provided with semi-elliptical springs; and Fig. 5 illustrates in diagram the method of applying the invention to motor cars having three-quarter elliptic springs.

Referring first to Fig. 1: 6 is the base casting of the device by which it is attached to the frame of the vehicle. It is subject to minor changes of form to suit the contour of the spring or spring horn to which it is applied. In Fig. 1 the spring horn is shown at 7 and the casting 6 is held in place by a bolt 8 engaging the hole or eye for the original spring shackle bolt. Tipping of the casting 6 is prevented by an undercut lug 9 which engages under the flange of the spring horn 7. This spring horn is, as is common in motor cars, of channel section. The form of the lug 9 is not material, the important idea being to pin the base casting 6 to the horn by a bolt through the shackle eye and to provide such additional engagement as will retain the device in upright position.

The base casting 6 is formed with a large cylindrical bore 10 and an oil chamber 11. An upper cast member 12 is threaded into the upper end of the base casting 6 and has a cylindrical bore 13 which constitutes an air chamber or cushion and which alines with the bore 10 of the base casting 6 to form therewith a single cushion cylinder closed at its upper end. The member 12 has a flange 14 which seats against the upper end of the base member 6, and the threaded extension beyond the flange 14 is so dimensioned as to leave a channel 15 at the junction of the two bores 10 and 13. This is filled by a felt washer designed to feed lubricant, and also to exclude dust tending to work up into the cylinder 13. It communicates with reservoir 11 through a duct and wick 16 so as to be kept saturated with oil. The reservoir 11 is closed by a filling cap 17 of any suitable form.

The head of the cylindrical member 12 is formed on its inner face with an inward tubular extension 18. This houses an inward opening check valve 19, preferably of the so-called universal type now commonly used in pneumatic tires. The tubular port closed by the valve 19 is further sealed by closing-cap 20. To keep the cap 20 clean from dust which might otherwise be blown into the device when it is charged with compressed air and to give a finished appearance, a dust cap 21 is provided.

Sliding in the cylinder is a piston 22. The body of this piston is made in the form of an elongated cylindrical shell forming a second air chamber or reservoir 23. The location of the reservoir in the piston permits a convenient location of the pump and vent mechanism, and is favorable to the special packing construction hereinafter described. Since the piston should in any case have considerable length to secure the necessary guiding surface, the location of the reservoir in the body of the piston results in a substantial economy of space. Other locations of the reservoir are, however, possible.

The upper end of the piston 22 is closed by a threaded thimble 24. This thimble is formed with a conical flange 25 at its upper periphery designed to retain a limited amount of oil above the piston packing by preventing this oil from splashing into the well of the thimble, whence, as will later be described, it would be pumped into the reservoir in the normal pumping action of the device.

The thimble 24 is also formed with two annular flanges 26 and 27, the upper flange 26 being thinner and of smaller diameter than the lower one, 27. Assembled between the lower face of the flange 27 and a shoulder 28, which is really a portion of the upper face of the piston casting 22, are three flexible packing rings preferably of chrome tanned leather or suitable oil-resisting rubber compound. The upper one, 29, is a cup packing. It overlies and is expanded by an expanding spring ring 30, held in the groove between the flanges 26 and 27, and overhanging the flange 26. The free edge of this cup packing extends toward the space above the piston, i. e., toward the cushion or cylinder working space of the device. The lower packing is a similar cup packing 31 whose plane surface rests against the shoulder 28. Between these two and partially within the cup packing 31, is a U-shaped packing 32.

The flange or plane portions of the packing 32 bear against the similar plane portions of the packing 29 and 31, and a series of Belleville spring washers 33 inserted between the plane or flange portions of the packing 32 gives the necessary pressure to produce a sealing action between the various packings. These washers 33 are merely annular plates which are slightly dished, and, after being properly tempered, are assembled with successive washers reversely positioned so that convex surface contacts with convex, and concave with concave. This structure is desirable because the pressure is evenly exerted over the entire annular surface of contact.

These washers also serve to preserve within the channel of the U-shaped packing 32 sufficient clearance for the admission of pressure fluid which will act to force the packing leathers 31 and 32 radially outward to seal the joint between the piston 22 and the cylinder 13. The pressure fluid to accomplish this purpose is taken from the reservoir 23 through a port 34. This port is formed by drilling and the threaded plug 134 is inserted to close the opening through the lower wall of piston 22. Although the pressure fluid in a cushion device is an expansible gas (ordinarily air) it is desirable to have a certain amount of lubricating liquid, ordinarily a heavy oil, within the system to lubricate the parts and to insure tight sealing of all valves and packing. I therefore arrange the port 34 so that it communicates with the bottom of reservoir 23 so that the pressure existing in reservoir 23 will feed oil up to the space behind the packing leather 32. Good chrome tanned leather is impervious to such oil, as are oil proof rubber compounds, and accordingly little or no seepage through the packing is to be expected. Such as may occur will assist in the lubrication of the piston and cylinder. The peripheries of both the packing 28 and the packing 31 project toward the cushion and the effect of this is to feed any oil seeping through these packings upward and toward the cushion so that it is kept within the system rather than allowed to flow down past the piston.

It should be noted that after the packing 29, 31 and 32 and the washers 33 are assembled with the piston 22 and thimble 24, the washers may be properly stressed by screwing the thimble into the piston, and that leakage from the reservoir is precluded by the packing.

The thimble 24 carries at its lower end a projecting cylinder 35. This extends down into the reservoir 23 and into a cup formed within that cylinder by an upstanding flange or wall 36. A small port 37 (which is shown unduly large in the drawings to make it visible) is formed through the wall 36 near the bottom thereof. Cylinder 35 is the pump cylinder of the device and its upper end is closed by a plug 38 having an axial guide-way for a tubular piston rod 39 and having admission ports 40 for the entrance of fluid from the cushion into the pump. A cup packing or leather 41 is clamped by the lower end of the plug 38 and seals against the piston rod 39. The free edge of the cup packing projects downward, i. e., away from the cushion space 13. Accordingly, it serves as a check valve permitting flow from the cushion space 13 toward the reservoir but sealing against back flow. The piston rod 39 carries at its lower end a piston head which is primarily a cup packing 42 sealing against the walls of the cylinder 35. The free edge of this cup packing also extends downward so that it too may operate as a check valve permitting flow from the cushion space 13 to the reservoir 23, but sealing against back flow.

Upward movement of the piston rod 39 is limited by a stop 43. A combined guide head and dash pot 44 is threaded on the upper end of piston rod 39. This is formed with a valve seat 45 having a spring urged ball check valve 46, which closes against flow from the reservoir to the cushion. The upper end of the member 44 is guided on extension 18 on the head of the cylinder 12 and the fit is close enough to give a checking or dash-pot action between the two in the presence of oil. This is to cushion the jar of collision between the member 44 and the head of the cylinder 12 under load oscillations or relative movements of the vehicle body and the running gear due to road irregularities. After a short movement from normal position the lower end of projection 18 will unseat check valve 46 allowing oil, and later air, if the valve remains open long enough, to be vented up through the hollow piston rod 39 from the reservoir 23. A lateral port 47 is provided in the member 44 to direct such oil against the walls of the cylinder 12 so that the maintenance of a supply of oil under the flange 25 is assured. Member 44 also has at its upper edge an outward projecting flange 48, and a spring 49 is held under compression between the flange 48 and the thimble 24.

The piston 22 has lugs 149 to receive a wrist or shackle pin 50 which connects a strut link 51. This link 51 is offset to clear the bolt 8 and is held against movement in a direction transverse to the vehicle by guide faces 52. The lower end of the strut link 51 is connected by a bolt 53 to a leaf spring 54 usually present in motor vehicles. Other methods of connecting the piston will be referred to later.

Assume that the spring has been applied to a vehicle. Caps 20 and 21 are removed and a limited quantity of oil is forced in past the valve 19. As stated, this oil is for the purpose of lubricating the parts and sealing the cup leathers and valves. Thereafter sufficient air is pumped in so that, when the pressure between the cushion space 13 and the reservoir 23 has equalized by flow past the cup leathers 41 and 42, the existing pressure will be as high as, and preferably higher than the pressure necessary in the cushion space 13 to support properly the heaviest load to be borne by the vehicle. The caps 20 and 21 are then replaced.

If the vehicle is now put in motion the road shocks will cause the piston 22 to oscillate against the pressure in space 13. This oscillation will cause collisions between member 44 and the head of the cylinder casting 12 which will be cushioned by the dash pot action between projection 18 and member 44, but which will force the piston 42 to move downward in the cylinder 35. The reverse movement will be gradual as it is caused by the spring 49. Thus the pump does not damp the action of the cushion, as the down stroke of the piston never displaces fluid through restricted passages and the up stroke is free of any movement of the cushion. The downward movement of the pump piston merely produces a difference of pressure between the working space of the pump and the cushion favorable to a flow of fluid from the cushion to the working space of the pump, and the reverse movement of the pump piston insures the transfer of this fluid from the working space of this pump to the reservoir. Thus the pressure fluid is forced or permitted to pass from the cushion to the reservoir according to road and load conditions, and this occurs under heavy and sudden load shocks. The reciprocation of the piston 42 will cause first oil and later air to be pumped from the cushion space 13 and discharged into the reservoir 23. Any oil in the cushion 13 except that under the flange 25 which is retained there to seal and lubricate the cup leathers, will collect in the bottom of the thimble 24 and will be pumped into the reservoir in preference to air. Consequently, there will always be oil in the reservoir.

Whenever the member 44 collides with the projection 18 the valve 46 will be unseated, but in the ordinary oscillation of the vehicle the valve 46 will be unseated only for short periods, first because of the short duration of the oscillations and second because of the dash pot action of member 44. The port through rod 39 is so long and so constricted that the oil flow will be slow. The parts are so proportioned that the pump action of the piston 42 will have a substantial predominance over momentary venting by the valve 46. If, however, the pumping action of the piston 42 reduces the pressure in the cushion 13 below that necessary to sustain the load properly, or if the load be substantially increased either by the addition of load to the vehicle or by side sway continuing for a substantial period of time, the continued unseating of valve 46 will allow the pump cylinder 35 and the port in rod 39 to be blown clear of oil, after which air will be vented into the cushion until the pressure reaches an amount sufficient properly to support the load, at which time extension 18 will free valve 46.

The function of the well 36 will now be apparent. The small port 37 insures that this well will be kept supplied with oil but its size is so minute that when a substantial venting occurs the rate of feed through the port 37 is wholly inadequate to meet the flow out of the well 36 so that the well 36, cylinder 35 and the port in piston rod 39 are quickly freed of oil by discharging past valve 46. From then on air is vented with substantially no oil.

It is important to note the course of the oil flowing from the well 36 through valve 46. It is sprayed against the walls of casting 12 by the port 47 and flowing down these walls fills the chamber under the flange 25. Any excess flows back into the well in thimble 24 and is thence pumped gradually back into the reservoir. Consequently, when the device is acting under the proper pressure for the load sustained and this load is practically constant so that the oscillations of the piston are those incident to ordinary road shocks, there is an almost continuous but very restricted transfer of oil from the reservoir to the cushion and back from the cushion to the reservoir. This action insures that all valves and packings remain tightly sealed and properly lubricated. The oil itself by its viscosity checks any tendency toward undue momentary venting action of the valve 46 but is quickly swept away to permit a rapid venting when the valve is held open for longer periods.

Since the pressure in the reservoir 23 is necessarily greater than that in the cushion 13 the packing leathers, and particularly the leather 32, are always forced outwardly against the walls of cylinder 12 with a force greater than that exerted by the liquid seeking a passage past them. This means that there will be practically no leakage of pressure fluid from the device and that it need be inflated only at relatively long intervals.

While the regenerative action of the device is important there will be occasional cases where the load variations imposed on the cushion are so slight that the pumping and venting features may be dispensed with. In that case I make use of a cushion such as shown in Fig. 2. Similar parts are indicated by similar reference numerals. The spring horn is indicated at 7 and the base casting of the cushion at 8. The device is clamped to the spring horn by a bolt through the original shackle eye and is further retained by a bolt 9ᵃ which is illustrated as an alternative substitute for the lug 9 shown in Fig. 1. The base casting 8 has a guide-way 10 and an oil well 11 which assumes a slightly different form, as will be apparent from the drawing. The cylinder casting 12, closed at its upper end, is screwed on to the base casting 6 so that the cushion space in cylinder 13 forms an extension of the guide-way 10. The flange 14, channel 15 and oil duct 16 are substantially identical with those illustrated in Fig. 1, while the oil filling cap 17 assumes a slightly different form better suited to the particular form of the casting. Projection 18 is similar to that shown in Fig. 1, but has no guiding function. The valve 19 and caps 20 and 21 are used as before. The piston 22 is similar to the piston in Fig. 1 and has a reservoir formed in it, and also has the thimble 24 and overhanging conical flange 25 designed to perform an oil retaining function. The thimble 24 so far as the packing structure is concerned, is identical with that shown in Fig. 1. This comment applies to the parts 26 to 34, inclusive. The thimble 24 is preferably made much deeper than in the structure of Fig. 1 as shown, so that it extends down into the reservoir and reduces the volume thereof. This volume is added to that of the cushion space 13 and permits a reduction in the length of the castings 6 and 12. Since there is no pump or venting mechanism in the structure of Fig. 2 a smaller volume is possible in the reservoir 23 because this reservoir has no function other than to retain a pressure higher than that ever existing in the cushion and available to seal the packing structure. Instead of the pump and vent mechanism a simple check valve 55 urged by a coil spring 56 is substituted.

In some cases it will be impossible to use a pivoted link such as the link 51 shown in connection with Fig. 1. In that event I contemplate using a guide plunger 56 which is connected with the piston 22 and slides in a bushed guide-way 57 formed in the casting 6. This is connected by a shackle bolt 58 with the leaf spring 59 or any other load supporting part of the vehicle structure. It should be particularly noted that the plunger 56 might be used with a regenerative spring such as shown in Fig. 1 and that the link 51 such as is shown in Fig. 1 might be used with a non-regenerative spring such as is shown in Fig. 2. The use of the plunger or link is determined by special considerations of the movement of parts of the motor vehicle associated with my cushion, and I will illustrate both methods to indicate their substantial equivalency.

Assume the device of Fig. 2 to be applied to a vehicle and not yet inflated. The caps 20 and 21 are removed and a suitable quantity of oil is forced in. Air is then pumped in until the equalized pressure in cushion 13 and reservoir 23 is slightly in excess of that desired to be maintained in the cushion. After the vehicle has been run a short distance the response of the cushion to road shocks will cause the pressure to equalize between the cushion 13 and the chamber 23 at a time when pressure is raised by the upward movement of the piston. This will result ultimately in equalization at the heaviest pressure which can exist under the load borne, and since the check valve closes against back flow from the reservoir 23, a condition will soon be reached where the pressure in reservoir 23 is substantially greater than that which exists in cushion 13. This condition can be more quickly reached by pumping an excess quantity of air through the valve 19, allowing the pressure to equalize between cushion 13 and reservoir 23, and then discharging some of the air from cushion 13 by holding valve 19 open. It will be possible, knowing the load which the vehicle is to sustain, to determine the correct initial pressure to apply and the amount to which this should be reduced in order to maintain a desirable differential between the reservoir and cushion.

While, as stated, the two types of spring shown in Figs. 1 and 2 are available for general use and may be connected in load-bearing relation in any of the various known manners, I desire to call attention particularly to typical installations in which they are interposed as a part of the leaf spring suspension in standard types of automobile running gear. In Fig. 4, 60 represents the side bar of the chassis, 61 being the front spring horn and 62 the rear spring horn. Since the front end of the vehicle is not subjected to heavy variations in load I ordinarily use a non-regenerative spring of the type shown in Fig. 2. This is indicated generally by the numeral 63. Since it is desirable that the spring shackle 64 be placed at the rear end of the leaf spring 65 I use a plunger connection between the leaf spring and the piston of the cushion exactly as shown in Fig. 2. At the rear I make use of a regenerative spring such as is shown in Fig. 1, and indicated in general by the numeral 66. Since again it is desirable to place the shackles at the rear of the leaf spring 67 I make use of the pivoted link construction illustrated in Fig. 1. In fact, Fig. 2 represents a typical front spring installation and Fig. 1 a typical rear spring installation for pleasure cars, but I wish it particularly to be understood that in some cases I might use only regenerative springs or only non-regenerative springs, their selection being primarily dependent on whether the load is or is not subject to wide variations.

In Fig. 5 I show the rear end of a chassis the parts being numbered similarly to similar parts in Fig. 4. Here, however, the spring is of the three-quarter elliptical type and the upper portion 68 of the elliptical spring takes the place of the rear spring horn 62. In this case the regenerative spring is formed with a depending extension 69 which is bolted to the end of the spring 68. A forked link takes the place of the link 51 shown in Fig. 1.

Various other modes of installing air springs embodying the features of the present invention will suggest themselves, and are contemplated by me. Hence I do not limit myself to the particular details of construction described.

What is claimed is:—

1. That method of adjusting pressure in pneumatic cushions to the load sustained thereby, which consists in substantially continually forcing pressure fluid out of said cushion and into a chamber at higher pressure, and counteracting the resulting reduction of cushion pressure in the proper degree by regulating a back flow of pressure fluid from said chamber to said cushion by means controlled by the relative positions of parts of the cushion.

2. That method of adjusting pressure in pneumatic cushions to a variable load sustained thereby, which consists in deriving energy from said load variations and applying it to force pressure fluid out of said cushion and into a chamber at higher pressure, and counteracting the resulting reduction of cushion pressure in the proper degree by regulating a back flow of pressure fluid from said chamber to said cushion by means controlled by the relative positions of parts of the cushion.

3. That method of adjusting pressure in elastic fluid pressure cushions to a variable load sustained thereby, which consists in substantially continually forcing pressure fluid out of said cushion and into a chamber at higher pressure, counteracting the resulting reduction of cushion pressure in the proper degree by regulating a back-flow of pressure fluid through a restricted passage from said chamber to said cushion by means controlled by the relative positions of parts of the cushion, and retarding slight or intermittent flow through said passage, without retarding sustained flow, by feeding a viscous liquid at a limited rate to said passage.

4. The method of adjusting the relative quantities of pressure fluid in pneumatic cushion devices initially charged with pressure fluid, which consists in forcing pressure fluid out of a cushion and into a chamber normally at higher pressure and counteracting the resulting reduction in the quantity of pressure fluid in the cushion by regulating the back flow of pressure fluid from the chamber to the cushion by the relative positions of the parts.

5. The method of adjusting the relative quantities of pressure fluid of initially charged pneumatic cushion devices for vehicles and the like, which consists in deriving energy from the relative movements of the body and the running gear of said vehicle and applying it to force pressure fluid out of a cushion and into a chamber normally at higher pressure and counteracting the resulting reduction of fluid in the cushion by regulating a back flow of pressure fluid from the chamber to the cushion.

6. The method of adjusting the relative quantities of pressure fluid between two chambers of initially charged pneumatic cushion devices for vehicles and the like, which consists in forcing pressure fluid from the first chamber to the second by means actuated by road irregularities and regulating the back flow of pressure fluid from the second chamber into the first one.

7. The combination of a pneumatic cushion having relatively movable heads; a closed reservoir, elastic pressure fluid confined in said cushion and reservoir; and means controlled by the movements of said heads and rendered operative by motive energy derived from said movements serving to transfer pressure fluid back and forth between said cushion and said reservoir to regulate the cushion pressure.

8. The combination of a pneumatic cushion; a closed reservoir; an elastic pressure fluid in said cushion and reservoir; means operable by the oscillation of parts of said cushion and serving to transfer pressure fluid forcibly between the cushion and reservoir in one direction at a rate dependent on the frequency and amplitude of such oscillation; and a port serving to permit a back-flow of pressure fluid and thereby regulate the cushion pressure.

9. A pneumatic cushioning device comprising a plurality of chambers sealed from the atmosphere and adapted to contain fluid under pressure; means whereby one of said chambers sustains a load; and means for establishing communication between the chambers to control the passage of pressure fluid from one chamber to the other and the back flow thereof into the first chamber according to load variations.

10. A pneumatic cushioning device for vehicles and the like comprising a cushion chamber interposed between the running gear and the body of the vehicle; a reservoir chamber, said chambers being sealed from the atmosphere and adapted to contain fluid under pressure; and means for establishing communication between the chambers to permit the flow of pressure fluid from the cushion chamber into the reservoir chamber and the back flow thereof into the cushion chamber according to variations in the load and road irregularities.

11. The combination of a pneumatic cushion; a closed reservoir; an elastic pressure fluid confined in said cushion and reservoir; a valve controlling a communication between said cushion and reservoir; means serving to open and close said valve by the movements of the cushion; a pump interposed between said cushion and reservoir and serving to pump pressure fluid from one to the other; and means for operating said pump.

12. The combination of a pneumatic cushion; a closed reservoir; an elastic pressure fluid confined in said cushion and reservoir; a valve controlling a communication between said cushion and reservoir; means serving to open and close said valve by the movements of said cushion; a pump interposed between said cushion and reservoir and serving to pump pressure fluid from one to the other; and means for operating said pump by the relative movement of parts of the cushion.

13. The combination of a pair of relatively movable abutments, forming a closed elastic fluid pressure cushion; a chamber forming a part of one of said abutments containing fluid under a pressure higher than that normally existing in said cushion; and a valve controlling flow of pressure fluid from said chamber to said cushion and operatively connected with said cushion to be opened by undue compression of the cushion.

14. The combination of a pair of relatively movable abutments forming a closed elastic fluid pressure cushion; a closed chamber; a pump operable to pump fluid from said cushion into said chamber; and means controlled by the relative position of parts of the cushion for opening and closing communication between said chamber and cushion.

15. The combination of a pair of relatively movable abutments forming a closed elastic fluid pressure cushion; a closed chamber; means for forcing fluid from said cushion into said chamber; and a valve controlling a restricted port between said cushion and chamber and operatively related to said abutments to be opened when said abutments approach each other within a desired minimum distance.

16. The combination of a pair of relatively movable abutments forming a closed elastic fluid pressure cushion; a chamber containing elastic fluid under a pressure higher than that normally existing in said cushion; a pump operable to pump pressure fluid from said cushion to said chamber; means for operating said pump by the oscillations of load imposed on said cushion; and a valve for controlling flow of pressure fluid from said chamber to said cushion and operably connected with said cushion to be opened upon undue compression of the cushion.

17. The combination of a pair of relatively movable abutments forming a closed elastic fluid pressure cushion; a chamber containing elastic fluid under pressure higher than that normally existing in said cushion; a somewhat viscous liquid lubricant in said cushion and chamber; a liquid collecting cup in said chamber; a pump connected to draw fluid from near the bottom of said cushion and discharge it into said chamber; means for operating said pump; a port leading from near the bottom of the well in said chamber to said cushion; and a valve mechanism serving to open and close said port and connected with said abutments to be operated by the relative movements thereof.

18. The combination of a pair of relatively movable abutments forming a closed elastic fluid pressure cushion; a chamber containing elastic fluid under pressure higher than that normally existing in said cushion; a somewhat viscous lubricating liquid in said cushion and chamber; a liquid collecting cup in said chamber there being a constricted liquid feeding port and a free gas feeding port from said chamber to said cup; a pump connected to draw fluid from near the bottom of said cushion and discharge it into said chamber; means for operating said pump; a vent port leading from near the bottom of said cup to said cushion, said vent port being less constricted than the liquid feed port to said cup; and a valve serving to open and close said vent port and connected with said abutments to be operated by the relative movements thereof.

19. The combination of a pneumatic cushion comprising movable members enclosing a chamber of variable volumetric capacity; fluid under pressure in said chamber; and a pump operated by relative movement of said members for reducing the fluid pressure in said chamber.

20. The combination of a cylinder and a piston sliding therein to form an elastic fluid pressure cushion; a chamber containing elastic fluid under pressure higher than that normally existing in said cushion; a valve controlled in its action by the position of said piston in said cylinder and itself controlling a back flow of pressure fluid from said chamber to said cylinder; a packing for sealing the joint between said cylinder and piston; and a connection for causing pressure from said chamber to act on said packing to seal the same.

21. The combination of a cylinder and a piston sliding therein to form an elastic fluid pressure cushion; a chamber formed in said piston and containing elastic fluid under pressure higher than that normally existing in said cushion; a valve controlled in its action by the position of said piston in said cylinder and itself controlling a back flow of pressure fluid from said chamber to said cylinder; a packing for sealing the joint between said cylinder and piston; and a connection for causing pressure from said chamber to act on said packing to seal the same.

22. The combination of a cylinder and a piston sliding therein to form an elastic fluid pressure cushion; a chamber containing elastic fluid under pressure higher than that normally existing in said cushion; a pump operable to pump pressure fluid from said cushion into said chamber; means for operating said pump by oscillations of the load imposed on said cushion; a valve controlled in its action by the position of said piston in said cylinder and itself controlling a back flow of pressure fluid from said chamber to said cylinder; a packing for sealing the joint between said cylinder and piston; and a connection for causing pressure from said chamber to act on said packing to seal the same.

23. The combination of a pair of relatively movable abutments forming a closed elastic fluid pressure cushion; a chamber containing elastic fluid under a pressure higher than that normally existing in said cushion; a single acting pump operable to force pressure fluid from said cushion to said chamber; means operable by the movement of said cushion to move said pump positively on its forcing strike; a spring for restoring said pump; and a valve for controlling flow of pressure fluid from said chamber to said cushion and operatively connected with said cushion to be opened by undue compression of the cushion.

24. The combination of a pair of relatively movable abutments forming a closed elastic fluid pressure cushion; a chamber containing elastic fluid under a pressure higher than that normally existing in said cushion; a single acting pump operable to force pressure fluid from said cushion to said chamber; means operable by the movement of said cushion to move said pump positively on its forcing strike; a spring for restoring said pump; a relatively long and restricted port leading from said chamber to said cushion; and a valve controlling said port and operatively connected with said cushion to be opened by undue compression of the cushion.

25. The combination of a pair of relatively movable abutments forming a closed elastic fluid pressure cushion; a chamber containing elastic fluid under a pressure higher than that normally existing in said cushion; a single acting piston pump operable to force fluid from the bottom of said cushion into said chamber, said pump having a back flow resisting check valve between the suction of the pump and the piston, and having a free discharge to said chamber; means for moving said pump positively on its forcing strike by the relative movement of said abutments; a spring for restoring said pump; a relatively long and restricted port leading from near the bottom of said chamber to said cushion; a valve controlling said port and operatively connected with said abutments to be opened by undue compression of the cushion; and a small quantity of viscous liquid lubricant constantly in circulation through said pump and port, and operative to check momentary flow through said port.

26. The combination of a cylinder, a piston thereon forming an elastic pressure fluid cushion; a chamber containing pressure fluid at a pressure higher than that existing in said cushion; a packing ring for sealing the joint between said piston and cylinder; and a passage for conducting pressure fluid from said chamber to act on said packing ring and seal the same.

27. The combination with a fluid pressure cushion device including a cylinder and a piston forming the cushion, and a chamber containing pressure fluid at a pressure higher than that normally existing in said cushion; of a U-shaped flexible packing ring for the cylinder and piston mounted in a groove; and means for conducting pressure fluid from said chamber to act in said groove behind said U-shaped packing to force the same into sealing contact with said cylinder and piston.

28. The combination with a fluid pressure cushion device including a cylinder and a piston forming the cushion, and a chamber containing pressure fluid at a pressure higher than that normally existing in said cushion; of a U-shaped flexible packing ring for the cylinder and piston mounted in a groove; a plurality of reversely arranged dished resilient washers assembled within said U-shaped packing to spread the same; and means for conducting pressure fluid from said chamber to act in said groove behind said packing to force the same into sealing contact with said cylinder and piston.

29. A piston for pneumatic cushions comprising in a single self-contained structure a pressure reservoir, a non-return valve device capable of admitting pressure fluid to said reservoir and a pressure actuated packing for said piston operable by pressure in said reservoir.

30. A piston for pneumatic cushions comprising in a single self-contained structure, a pressure reservoir; a pump and a vent valve for varying the pressure condition in said reservoir; and a pressure actuated packing for said piston, operable by pressure in said reservoir.

31. A piston for pneumatic cushions comprising in a single self-contained structure, a pressure reservoir; a pump and a vent valve, both capable of actuation by the movements of the piston in a suitable cylinder to vary the pressure condition in said reservoir; and a pressure actuated packing for said piston operable by pressure in said reservoir.

32. The combination of a base adapted to fit upon the spring horn of a vehicle and having holes therein adapted to register with the shackle bolt holes of said horn; secondary means connecting said base with said horn; a cushion chamber carried on said base; a plunger in said cushion chamber; and a strut operatively related to said plunger adapted to be connected to the spring of a vehicle and off-set to clear a bolt inserted through the shackle bolt holes of the spring horn and the registering holes in said base.

33. The combination of a base adapted to fit upon the spring horn of a vehicle and having holes therein adapted to register with the shackle bolt holes of said horn; secondary means connecting said base with said horn; a cushion chamber carried on said base; a plunger in said cushion chamber; and an off-set strut link pivotally connected to said plunger and adapted to be pivotally connected to the spring of a vehicle, said off-set link passing clear of a bolt inserted through said shackle bolt holes and the registering holes in said base.

34. The combination of a base adapted to fit upon a supported member of a vehicle spring-suspension and having a hole adapted to register with the shackle-bolt hole of said member, secondary means for connecting said base to said supported member; a cushion device carried by said base and including a plunger; and a strut pivotally connected with said plunger and adapted to be pivotally connected with the supporting spring of said vehicle suspension, said strut and base being so formed that the latter passes clear of a bolt inserted through said shackle bolt hole, in all positions assumed by said plunger.

35. That method of sealing pneumatic cushions which consists in providing a packing capable of being sealed by fluid pressure, and continually pumping pressure fluid out of the cushion and causing it to act on said packing whereby the sealing pressure on the packing is greater than the pressure on the cushion.

In testimony whereof I have signed my name to this specification.

BRADFORD B. HOLMES.